United States Patent [19]

Kitahama et al.

[11] Patent Number: 5,415,594

[45] Date of Patent: May 16, 1995

[54] V-RIBBED BELT

[76] Inventors: Koji Kitahama; Masahiko Kawashima; Kyoichi Mishima, all c/o Mitsuboshi Belting Ltd., P.O. Box 27, Nagata, Kobe, Japan

[21] Appl. No.: 147,117

[22] Filed: Nov. 3, 1993

[30] Foreign Application Priority Data

Nov. 4, 1992 [JP] Japan .................................. 4-082725

[51] Int. Cl.⁶ .............................................. F16G 5/08
[52] U.S. Cl. ..................... 474/263; 474/268
[58] Field of Search ................... 474/260–268

[56] References Cited

U.S. PATENT DOCUMENTS

| 4,657,526 | 4/1987 | Tangorra et al. | 474/263 X |
| 4,708,702 | 11/1987 | Robecchi et al. | 474/261 |
| 4,708,703 | 11/1987 | Macchiarulo et al. | 474/263 X |
| 4,786,274 | 11/1988 | Robecchi et al. | 474/263 |
| 4,798,566 | 1/1989 | Sedlacek | 474/263 X |
| 4,904,232 | 2/1990 | Kitahama et al. | |
| 5,197,928 | 3/1993 | Mishima et al. | |

FOREIGN PATENT DOCUMENTS

| 176686A2 | 4/1986 | European Pat. Off. . |
| 215226A1 | 3/1987 | European Pat. Off. . |
| 249404A3 | 12/1987 | European Pat. Off. . |
| 317316A1 | 5/1989 | European Pat. Off. . |
| 440425A1 | 8/1991 | European Pat. Off. . |
| 3535676 | 5/1987 | Germany . |

OTHER PUBLICATIONS

Patent Abstracts of Japan—Publ. No. JP3219147, Sep. 1991.
Patent Abstracts of Japan—Publ. No. JP62113940, May 1987.

*Primary Examiner*—Michael Powell Buiz
*Attorney, Agent, or Firm*—Wood, Phillips, VanSanten, Clark & Mortimer

[57] ABSTRACT

A power transmission belt having a body with a compression section and a length. A first plurality of short fibers is embedded in the compression section of the body aligned to be substantially parallel to the length of the belt. A second plurality of short fibers is embedded in the compression section of the body and aligned to be transverse to the length of the belt.

21 Claims, 2 Drawing Sheets

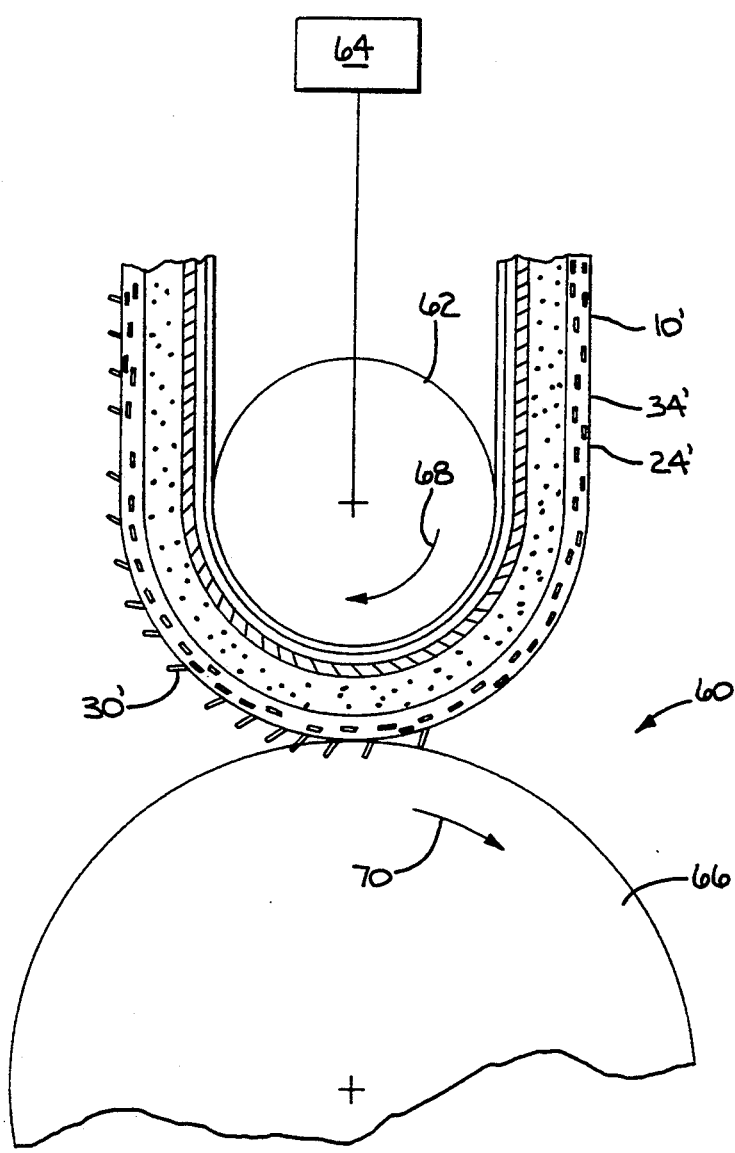
FIG. 4
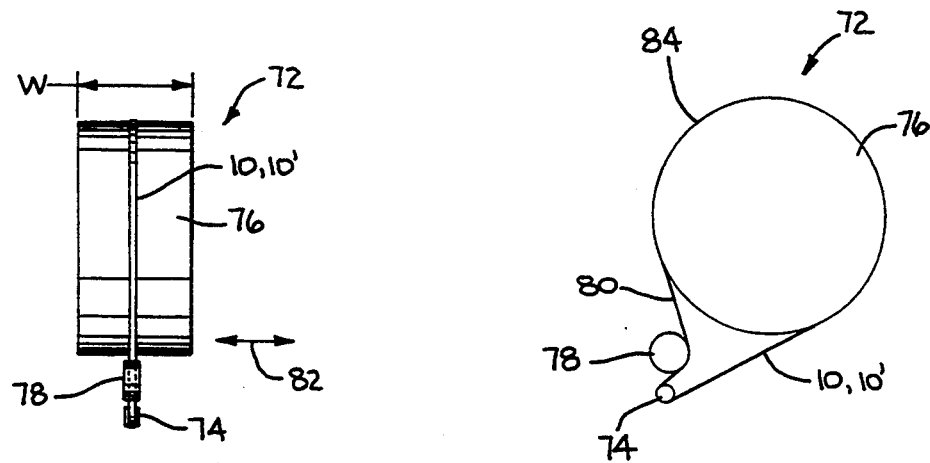
FIG. 5
FIG. 6

V-RIBBED BELT

BACKGROUND OF THE INVENTION

1. Field of the Invention

This invention relates to power transmission belts and, more particularly, to a power transmission belt in which short fibers are embedded.

2. Background Art

V-ribbed power transmission belts have a wide range of uses. They are commonly used in the automotive industry, on agricultural equipment, home appliances, etc.

V-ribbed belts are normally wound around pulleys with grooves that are complementary to the V-shaped ribs on the belt. Power transmission is effected by making use of frictional forces generated between the surfaces on the ribs of the belt and confronting pulley surfaces. It is known to embed short fibers in the ribbed portions of V-ribbed belts to improve resistance to pressure applied laterally to the ribs in use and to reinforce the ribs. Typically, the fibers are directed in a lateral direction, i.e. perpendicular to the length of the belt.

In some systems, the inside surface of the V-ribbed belt is used to drive/be driven by a flat pulley. The inside belt surface, with the laterally extending fibers, is compressed by the cooperating pulley surface.

Because the fibers extend in a lateral direction, they dislodge readily from the inside belt surface during manufacture. Grinding of the inside surface of the belt tends to draw off any exposed fibers so that no significant amount of the laterally extending fibers remains exposed on the inside surface of the completed belt. As a result, a cooperating flat pulley will engage principally the rubber within which the fibers are embedded so that the frictional forces between the belt and pulley are significantly larger than they would be if the fiber was exposed. As a result, significant "creak noise"/"stick slip noise" is generated as slippage occurs between the belt and pulley.

SUMMARY OF THE INVENTION

The present invention is directed to, among other things, overcoming the problem of stick slip noise during power transmission belt operation. The invention is particularly adaptable to avoid generation of stick slip noise between a V-ribbed belt and a cooperating flat pulley. The invention also affords advantages with the V-ribbed belt cooperating with a pulley having a complementary groove configuration.

More particularly, the present invention is directed to a power transmission belt having a body with a compression section and a length. A first plurality of short fibers is embedded in the compression section of the body and aligned to be transverse, and in one form substantially perpendicular, to the length of the belt. A second plurality of short fibers is embedded in the compression section of the body and aligned to be substantially perpendicular to the length of the belt.

In one form, the belt has inside and outside surfaces, with the first plurality of short fibers embedded in a first layer and the second plurality of short fibers embedded in a second layer, with the first layer being inside of the second layer so as to be at least partially exposed at the inside of the belt.

Resultingly, the fibers extend lengthwise of the belt at the inside surface thereof so that they tend to remain adhered to the belt, even with the belt formed by a grinding process.

In one form, the first layer is thinner than the second layer in the direction between the inside and outside of the belt.

In the case of a belt having one or more ribs, the rib(s) has a height between the inside and outside surfaces of the belt and the first layer has a dimension in the same direction that is 10–30% of the height of the rib.

In one form, fibers in the first plurality of fibers project from the inside surface of the belt between 0.1 and 3.0 mm.

In another form of the invention, fibers in the first plurality of fibers are exposed at the inside surface of the belt over between 50–95% of the area of the inside surface of the belt.

Fibers in the first plurality of short fibers are preferably aligned to make an angle of no more than 30° with the length of the belt.

Fibers in the first plurality of fibers have a length preferably between 3–10 mm and are embedded in a rubber layer in an amount between 5 to 30 weight parts per 100 weight parts of rubber in that layer.

The fibers can be made from a number of different materials. Suitable materials are: nylon; vinylon; polyester; aromatic polyamide; mixed threads of cotton and one of nylon, vinylon, polyester, and aromatic polyamide; and mixed threads of pulp and at least one of nylon, vinylon, and aromatic polyamide.

The invention also contemplates incorporation into a double-ribbed belt having a neutral axis and longitudinally extending ribs both inside and outside of the neutral axis. A third plurality of short fibers is embedded in a first layer outside of the neutral axis, with a fourth plurality of fibers embedded in a second layer outside of the neutral axis. Fibers in the third plurality of fibers are aligned to be substantially parallel to the length of the belt, with fibers in the fourth plurality of fibers aligned to be transverse, and in one form perpendicular, to the length of the belt.

The third layer is outside of the fourth layer and exposed at the outside of the belt, with there being fibers in the third plurality of fibers exposed at the outside of the belt.

The invention further contemplates a power transmission belt having a body with a first plurality of short fibers embedded in a first layer and aligned substantially parallel to each other in a first line, and a second plurality of short fibers embedded in a second layer and aligned substantially parallel to each other in a second line, with the first and second lines being transverse to each other. Fibers in one of the first and second plurality of fibers are exposed at one of the inside and outside surfaces of the body, with the first line making an angle of 0° to 30° with the length of the belt.

In another form of the invention, a power transmission belt is provided having a body with an inside surface and an outside surface, with one of the inside and outside surfaces being configured to engage a pulley. A rubber layer defines one of the inside and outside body surfaces, with there being a plurality of fibers embedded in the rubber layer and exposed at the one of the inside and outside surfaces of the belt body. The belt has a length and the plurality of fibers is aligned with the length of the belt.

BRIEF DESCRIPTION OF THE DRAWINGS

FIG. 4 is a schematic, side elevation view of an apparatus for causing short fibers to project from one of the belt surfaces according to the present invention;

FIG. 5 is a schematic end view of a system wherein a V-ribbed belt is used to drive a flat pulley; and FIG. 6 is a schematic, side elevation view of the system in FIG. 5.

DETAILED DESCRIPTION OF THE DRAWINGS

Figure 1:
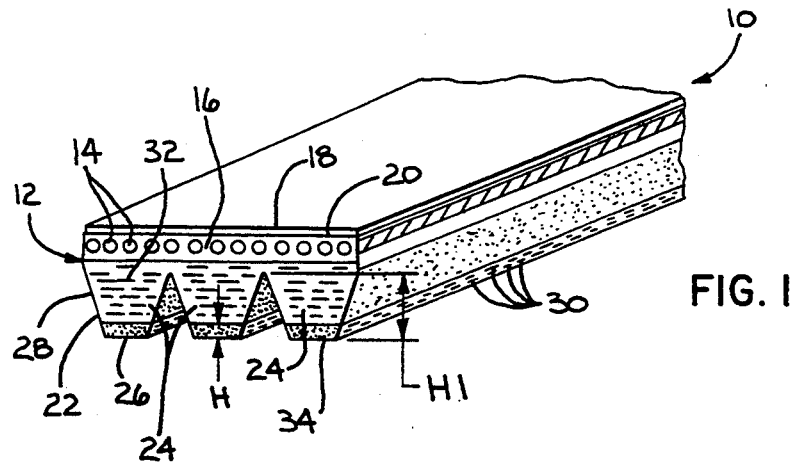
FIG. 1 is a fragmentary perspective view of a V-ribbed belt according to the present invention.
Figure 2:
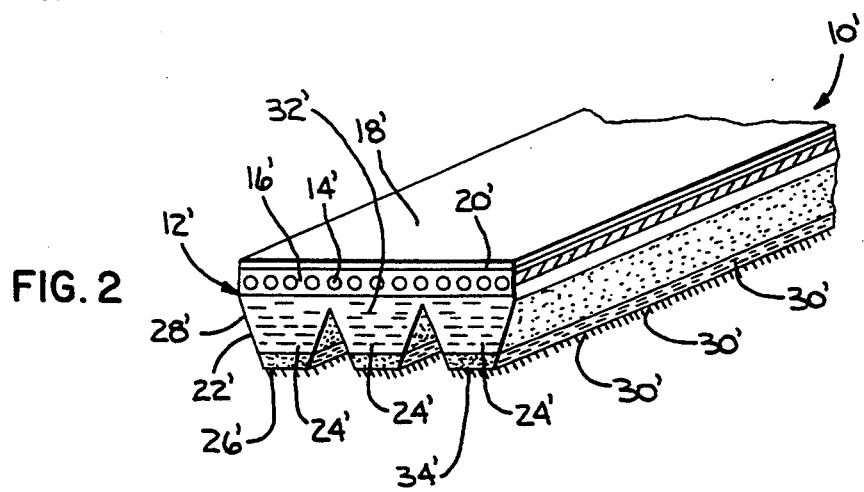
FIG. 2 is a fragmentary perspective view as in FIG. 1 of a modified form of V-ribbed belt, with the present invention incorporated therein.

In FIGS. 1 and 2, V-ribbed belts are shown with the present invention incorporated therein. The V-ribbed belt 10 in FIG. 1 has one form of the invention incorporated therein. The V-ribbed belt 10' in FIG. 2 has another form of the invention incorporated therein. The belts 10, 10' have the same basic structure. Consequently, the parts of the belt 10' in FIG. 2 will be numbered the same as the corresponding parts of the belt 10 in FIG. 1, with the exception of the addition of a "'" after each reference numeral.

The belt 10 has a body 12 within which a plurality of laterally spaced, longitudinally extending, load carrying cords 14 are embedded. The load carrying cords 14 are made from a low elongation, high strength rope made from polyester, aromatic polyamide fiber, or the like. The load carrying cords 14 are embedded in an adhesive rubber layer 16 made of one, or a blending of, NR, SBR, or CR.

One or more canvas layers 18 (one shown) having rubber coated, woven warp and weft threads are laminated over each other and bonded to the outside surface 20 of the body 12.

The body 12 defines a compression section 22 within which a plurality of laterally spaced, longitudinally extending, V-shaped ribs 24 are formed. The ribs 24 are made from the same rubber material that defines the adhesive rubber layer 16.

According to the invention, the ribs 24 are made with at least two distinct layers, with there being a first, inside layer 26 and a second, outside layer 28, which abuts to the inside layer 26. The inside layer 26 has fibers 30 embedded therein. The outside layer 28 has fibers 32 embedded therein. As described in greater detail below, the orientation of the fibers 30, 32 in the separate layers 26, 28, is different.

The inside layer 26 has a thickness H, taken in a direction between the inside and the outside of the belt 10, that is 10 to 30% of the overall height H1 of the ribs 24.

The fibers 30 in the layer 26 are preferably made from one of nylon, vinylon, polyester or aromatic polyamide or mixed threads of cotton or pulp with one or more of the above synthetic fibers.

The fibers 30 have a length of 3 to 10 mm and are present in an amount of 5 to 30 weight parts of fiber 30 for each 100 weight parts of rubber. The fibers 30 are aligned so that their length is substantially parallel to the length of the belt. Preferably, the line of the fibers 30 does not deviate by more than 30° with respect to the length of the belt.

The outside layer 28, which abuts to the inside layer 26 and extends from the inside layer 26 to the outside of the ribs 24, has fibers 32 therein in the same concentration as the fibers 30 in the layer 26, i.e. 5 to 30 weight parts of fiber 32 for each 100 weight parts of rubber. The fibers 32 also have the same composition as the fibers 30. However, the fibers 32 have their lengths aligned in a direction transverse, and preferably substantially perpendicular, to the fibers 30 and the length of the belt 10.

The fibers 30 in the belt 10 are exposed at the inside surface 34 of the belt 10. The primary difference between the belt 10' in FIG. 2 and the belt 10 in FIG. 1 is that the fibers 30' in the belt 10' are caused to project from the inside belt surface 34'.

With both belts, the coefficient of friction between the inside surfaces 34, 34' on the cooperating pulley is reduced. With the belt 10' in FIG. 2, the coefficient of friction is reduced to a greater extent than for the belt 10 in FIG. 1.

Figure 3:
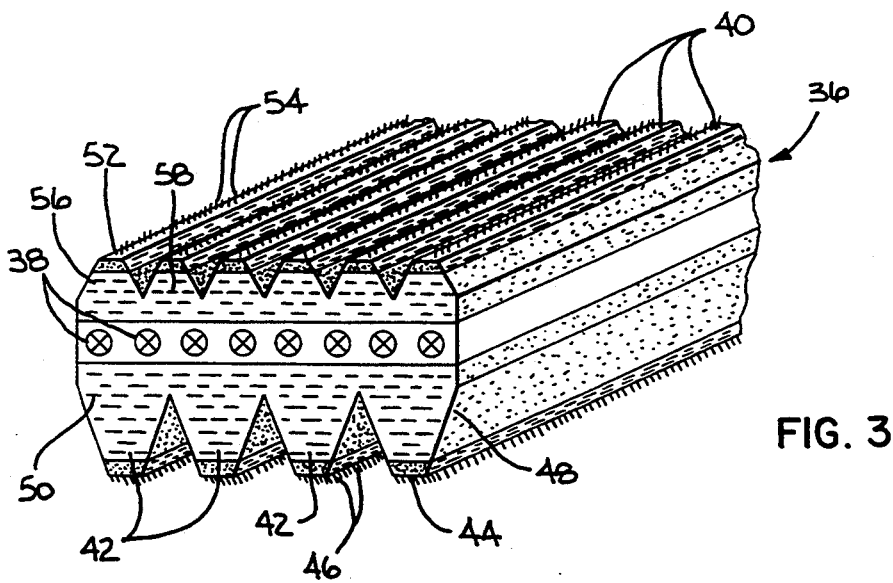
FIG. 3 is a fragmentary perspective view of a two-sided V-ribbed belt incorporating the present invention.

FIG. 3 shows a two-sided V-ribbed belt 36 with load carrying cords 38 defining a belt neutral axis, a plurality of V-shaped ribs 40 on one side of the belt neutral axis, and a plurality of V-shaped ribs 42 on the other side of the neutral axis.

The ribs 42 are constructed in substantially the same manner as the ribs 24' on the belt 10' in FIG. 2. That is, there is a first layer 44, with longitudinally extending fibers 46 embedded therein and projecting therefrom, and a second layer 48 with laterally extending fibers 50 embedded therein.

The ribs 40 have the same general construction as the ribs 42 with the exception that they face oppositely and are on the opposite side of the load carrying cords 38. That is, there is a third layer 52 with longitudinally extending fibers 54 embedded therein and projecting therefrom. The layer 52 abuts to a fourth layer 56, which has laterally extending fibers 58 embedded therein. The principle of operation of the belt 36 is the same as for the belts 10, 10', with all the advantages of the inventive structure being realized therefrom.

FIG. 4 schematically shows a system at 60 for grinding the belts 10', 36 so as to cause the projection of fibers 30', 46, 54 from their respective layers. This system 60 is used to perform what is known in the industry as a "bi-axial expansion method".

For purposes of illustration, the belt 10' is shown mounted around a pair of shafts 62, 64 in inside-out orientation. A grinding wheel 66 is pressed against the inside surface 34' of the ribs 24'. The main grinding shaft 62 and grinding wheel 66 are both rotated in a clockwise direction, as indicated by the arrows 68, 70. Alternatively, the grinding wheel 66 could be rotated in a counterclockwise direction, with the main grinding shaft 62 rotated in a clockwise direction. The grinding wheel 66 causes the fibers 30' to be drawn away from the surface 34', as seen in FIG. 4. The grinding wheel 66 scrapes the free ends of the fibers 30' off of the surface 34' as the grinding step is carried out.

It has been found that if the lengths of the fibers 30' make greater than a 30° angle with the length of the belt 10', an excessive amount of these fibers 30' are scraped completely off of the belt 10' with a system like that 60 in FIG. 4. As a consequence, the benefits of friction reduction are not realized.

While the belts 10, 10', 36 are contemplated for use with pulleys having complementary V-shaped grooves, the belts 10, 10', 36 can also be used as a flat belt to drive/be driven by a flat pulley. In some systems, the V-ribbed belts 10, 10', 36 cooperate with both ribbed and flat pulleys. A schematic representation of one such system is shown in FIGS. 5 and 6 at 72.

The system 72 has a ribbed pulley 74 which, through the belt 10, 10', drives a flat pulley 76. A flat pulley 78 is used to tension an unsupported portion 80 of the belt 10, 10' trained around the pulleys 74, 76.

In one such system, the belt 10, 10' is slidable in the direction of the double-headed arrow 82 relative to the driven pulley 76.

The drive pulley 74 has a diameter of 14 to 16 mm and is driven at 1800 rpm. The driven pulley 76 has a diameter of 500 to 600 mm and a width W of 300 mm. The tensioning pulley 78 has a diameter of 30 mm. The belt 10, 10' used with this system 72 has a width of 4 mm. The belt 10, 10' is engaged by pulleys on both sides thereof and can be positively driven through a small diameter drive pulley 74 so that rotation is imparted to the larger flat pulley 76.

With the belt 10, 10' driving/being driven by a flat pulley, such as the pulley 76 in FIGS. 5 and 6, it has been found that it is important to make the layer 26, 26' to have a thickness H equal to at least 10% of the height of the ribs 24, 24'. The layer 26, 26' is abraded significantly by the cooperating surface 84 on the pulley 76. Once the layer 26, 26' wears significantly, the sound limiting benefits of the invention diminish significantly.

It has been found that if the layer 26, 26' is made to have a thickness greater than 30% of the height of the ribs 24, 24', the belt 10, 10' becomes too rigid. As the more rigid belt 10, 10' bends, there is a risk of cracks developing in the layer 26, 26'.

With the inventive structure, when the V-ribbed belt 10, 10' cooperates with pulleys having cooperating grooves, the fibers 32, 32' in the layers 28, 28' afford the necessary rigidity to the ribs 24, 24' in a lateral direction as applied through the pulleys. When the V-ribbed belt 10, 10' is wound around flat pulleys to operate as a flat belt, the fibers 30, 30', which are exposed and/or project from the ribs 24, 24', reduce the friction coefficient between the belt 10, 10' and a cooperating flat pulley surface, to thereby avoid generation of harsh, grating stick slip noise.

The foregoing disclosure of specific embodiments is intended to be illustrative of the broad concepts comprehended by the invention.

We claim:

1. A power transmission belt comprising:
   a body having a compression section comprising an elastomeric material, a length, and inside and outside surfaces;
   a first plurality of short fibers embedded in the compression section of the body and aligned to be substantially parallel to the length of the belt; and
   a second plurality of short fibers embedded in the compression section of the body and aligned to be transverse to the length of the belt,
   wherein a plurality of short fibers in the first plurality of short fibers is embedded in the elastomeric material and projects outwardly from one of the inside and outside surfaces of the body.

2. The power transmission belt according to claim 1 wherein the first plurality of short fibers is embedded in a first layer in the compression section and the second plurality of short fibers is embedded in a second layer in the compression section.

3. The power transmission belt according to claim 2 wherein the first layer has a dimension between the inside and outside of the belt that is less than the dimension of the second layer between the inside and outside of the belt.

4. The power transmission belt according to claim 1 wherein the power transmission belt is a V-ribbed belt.

5. The power transmission belt according to claim 1 wherein fibers in the first plurality of fibers project outwardly from the inside surface of the belt.

6. The power transmission belt according to claim 5 wherein the fibers in the first plurality of fibers projects from between 0.1 and 3.0 mm from the inside surface of the belt.

7. The power transmission belt according to claim 5 wherein the fibers in the first plurality of fibers are exposed over from 50–95% of the area of the inside surface of the belt.

8. The power transmission belt according to claim 1 wherein the first plurality of short fibers is aligned to make an angle of no more than 30° with the length of the belt body.

9. The power transmission belt according to claim 1 wherein fibers in the first plurality of fibers have a length of 3–10 mm.

10. The power transmission belt according to claim 1 wherein the first plurality of fibers is embedded in a first layer defined by the elastomeric material and the first plurality of fibers is present in an amount between 5–30 weight parts per 100 weight parts of elastomeric material in said first layer.

11. The power transmission belt according to claim 1 wherein fibers in the first plurality of fibers are made from at least one of a) nylon, b) vinylon, c) polyester, d) aromatic polyamide, e) mixed threads of cotton and at least one of nylon, vinylon, polyester and aromatic polyamide, and f) mixed threads of pulp and at least one of nylon, vinylon, polyester and aromatic polyamide.

12. The power transmission belt according to claim 1 wherein a longitudinally extending rib is defined by the body, the belt has inside and outside surfaces, the rib has a height between the inside and outside surfaces of the belt, and the dimension of the first layer between the inside and outside of the belt is from 10–30% of the height of the rib.

13. The power transmission belt according to claim 1 wherein the belt is a double-ribbed belt with inside and outside surfaces and having a neutral axis and longitudinally extending ribs both inside and outside of the neutral axis, said first and second plurality of short fibers being inside the neutral axis, there being a third plurality of short fibers embedded in a first layer outside of the neutral axis and a fourth plurality of short fibers embedded in a second layer outside of the neutral axis, said third plurality of fibers aligned to be substantially parallel to the length of the belt, said fourth plurality of fibers aligned to be transverse to the length of the belt.

14. The power transmission belt according to claim 13 wherein the third layer is outside of the fourth layer and exposed at the outside of the belt, there being fibers in the third plurality of fibers exposed at the outside of the belt.

15. A power transmission belt comprising:
   a body having a length and inside and outside surfaces;
   a first plurality of short fibers embedded in a first layer and aligned substantially parallel to each other in a first line; and a second plurality of short fibers embedded in a second layer and aligned substantially parallel to each other in a second line, wherein said first and second lines are transverse to each other, further wherein fibers in the first plurality of fibers are exposed at one of the inside and outside surfaces of the body, with the first line making an angle of 0°–30° with the length of the belt, wherein one of the first and second layers has a dimension between the inside and outside of the body that is substantially greater than the dimension of the other of the first and second layers between the inside and outside of the body.

16. The power transmission belt according to claim 15 wherein the first and second lines are substantially perpendicular to each other, the other of the first and second layers is exposed on one of the inside and outside surfaces of the body and the fibers in the other of the first and second layers are aligned with the length of the body.

17. The power transmission belt according to claim 16 wherein the first and second layers abut to each other and define substantially the entire compression section on the body.

18. The power transmission belt according to claim 15 wherein fibers in the first plurality of fibers project from the one of the inside and outside surfaces of the belt body a distance between 0.1 and 3.0 mm.

19. The power transmission belt according to claim 15 wherein fibers in the first plurality of fibers have a length between 3 and 10 mm.

20. A power transmission belt comprising:

a body having an inside surface and an outside surface;

at least one of said inside and outside surfaces being configured to engage a pulley to drive/be driven by the power transmission belt;

there being a rubber layer defining the one of the inside and outside body surfaces; and a plurality of fibers embedded in the rubber layer, said plurality of fibers being exposed at and projecting from the one of the inside and outside surfaces of the belt body.

21. The power transmission belt according to claim 20 wherein fibers in the plurality of fibers project from the one of the inside and outside surfaces of the belt body between 0.1 and 3 mm.

* * * * *